(12) United States Patent
Bosch et al.

(10) Patent No.: US 11,566,168 B1
(45) Date of Patent: Jan. 31, 2023

(54) BIOCIDE BLEND FOR TREATING WELLBORES

(71) Applicant: Halliburton Energy Services, Inc., Houston, TX (US)

(72) Inventors: Ronald Bosch, Houston, TX (US); Alec Breen, Houston, TX (US); Dana Safarian, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/305,628

(22) Filed: Jul. 12, 2021

(51) Int. Cl.
| | |
|---|---|
| *C09K 8/60* | (2006.01) |
| *C09K 8/86* | (2006.01) |
| *C09K 8/54* | (2006.01) |
| *A01N 33/12* | (2006.01) |
| *A01N 25/02* | (2006.01) |
| *A01N 37/34* | (2006.01) |
| *E21B 43/00* | (2006.01) |
| *A01N 43/66* | (2006.01) |
| *A01N 33/20* | (2006.01) |
| *A01N 43/76* | (2006.01) |
| *A01N 31/02* | (2006.01) |
| *A01N 35/02* | (2006.01) |

(52) U.S. Cl.
CPC ............. *C09K 8/605* (2013.01); *A01N 25/02* (2013.01); *A01N 31/02* (2013.01); *A01N 33/12* (2013.01); *A01N 33/20* (2013.01); *A01N 35/02* (2013.01); *A01N 37/34* (2013.01); *A01N 43/66* (2013.01); *A01N 43/76* (2013.01); *C09K 8/54* (2013.01); *C09K 8/86* (2013.01); *E21B 43/00* (2013.01); *C09K 2208/20* (2013.01)

(58) Field of Classification Search
None
See application file for complete search history.

(56) References Cited

U.S. PATENT DOCUMENTS

| | | | |
|---|---|---|---|
| 4,470,918 A * | 9/1984 | Mosier | C09K 8/035 |
| | | | 508/513 |
| 5,016,714 A | 5/1991 | McCabe et al. | |
| 5,744,024 A | 4/1998 | Sullivan, III et al. | |
| 2009/0036331 A1* | 2/2009 | Smith | C09K 8/08 |
| | | | 507/138 |
| 2012/0073821 A1* | 3/2012 | Holtsclaw | C09K 8/035 |
| | | | 166/310 |
| 2016/0096753 A1 | 4/2016 | Kakadjian et al. | |
| 2016/0208193 A1 | 7/2016 | Caskey, Jr. et al. | |
| 2017/0251666 A1 | 9/2017 | McSherry et al. | |
| 2018/0155597 A1* | 6/2018 | Burns | C09K 8/58 |
| 2021/0017567 A1* | 1/2021 | Safarian | A01N 33/12 |

FOREIGN PATENT DOCUMENTS

WO 2020-039199 A1 2/2020

* cited by examiner

Primary Examiner — John J Figueroa
(74) Attorney, Agent, or Firm — Sheri Higgins; Sheri Higgins Law, PLLC

(57) ABSTRACT

A biocide blend can be used in an oil or gas operation. The biocide blend can include a first biocide of a formaldehyde-releasing biocide and a second biocide of a quaternary ammonium compound. The formaldehyde-releasing biocide can release formaldehyde after introduction into a wellbore. The first and second biocide can possess at least one property that is the same. The first biocide and/or the second biocide can maintain biocidal activity for extended periods of time in high salinity wellbore fluids, be thermally stable, and less expensive than other biocides.

20 Claims, 14 Drawing Sheets an uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

BIOCIDE BLEND FOR TREATING WELLBORES

TECHNICAL FIELD

A blend of two or more different biocides can be used to treat a wellbore. Each of the biocides within the blend can possess the same or different properties, such as good biocidal performance in fluids having a high total dissolved solids, thermal stability, and good persistence. The biocides within the blend can be selected to achieve all desired properties.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
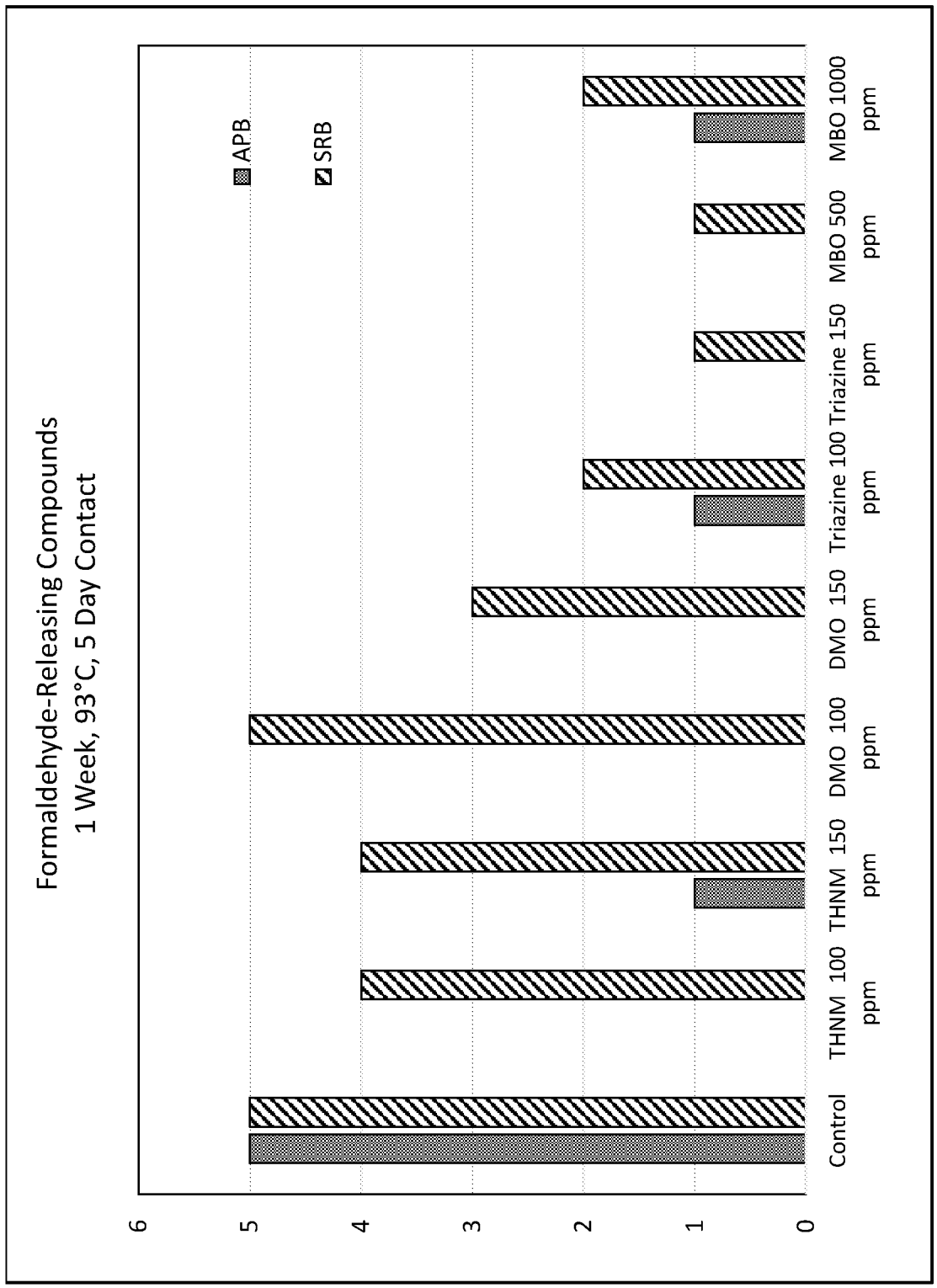
FIGS. 1 and 2 are bar graphs showing biocidal activity of different formaldehyde-releasing compounds.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals, "MPa"). A fluid can be a liquid or gas. A homogenous fluid has only one phase, whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore.

A portion of a wellbore can be an open hole or a cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to: the space between a wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

Biocides are commonly used in a variety of industries, including medicine, agriculture, forestry, and oil and gas. A "biocide" is a chemical substance or microorganism that can destroy, deter, render harmless, or exert a controlling effect on another organism by chemical or biological means. Biocides can be added to other materials (typically liquids) in order to protect the material against biological infestation and growth. Some chemical biocides are synthetic. Biocides that are microorganisms include several types of bacteria. Biocides are also used as anti-fouling agents and disinfectants.

Treatment fluids used in the oil and gas industry commonly include additives and other ingredients used to perform a particular treatment operation within the wellbore or subterranean formation. Such treatment operations can include a fracturing operation, drilling operation, or workover operation. The additives and other ingredients can be made from polymers. Some microorganisms that may be present in the well can consume the additives and other substances present in the treatment fluid. If the additive is consumed by the microorganisms, then the additive is no longer present in the treatment fluid to perform its necessary function.

Moreover, when a microorganism consumes an additive or ingredient, the microorganism can flourish, which can foul the treatment fluid and create an unpleasant smell. Some microorganisms can produce hydrogen sulfide ($H_2S$) gas as a respiration end product, which accumulates extracellularly during consumption. It is undesirable for a well to contain high amounts of a sour gas, such as hydrogen sulfide gas (commonly called a sour gas well). Sour gas is considered to be a corrosive substance, which can be detrimental to wellbore operations; for example, harmful to wellbore equipment, such as pumping equipment or pipes. Therefore, it is often desirable to include a biocide in a treatment fluid. The biocide can function to destroy or deter the microorganism from consuming the additives or other ingredients in a treatment fluid and reducing or eliminating sour gas production.

There are desirable properties that a biocide can possess. One example is maintaining biocidal activity in fluids having a high salinity or a high concentration of total dissolved solids. Another example is being thermal stable (i.e., maintaining biocidal activity up to a certain temperature).

Another example is maintaining biocidal activation in the presence of ammonia or primary amines. Other examples include, but are not limited to, being able to kill a microbe quickly, persistence of the biocide within a wellbore, and no interaction between the biocide and other additives within a treatment fluid.

It is not uncommon for a particular biocide to possess some desirable properties but not all desirable properties. Therefore, biocide blends can be used instead of a single biocide. The biocide blend can include two or more different biocides that each possess different properties and can also have overlapping properties. By way of example, a first biocide can possess thermal stability and no deactivation with ammonia and a second biocide can possess activity in high salinity and no deactivation with ammonia.

Challenges and disadvantages exist with biocide blends. One challenge is the ability to select the exact biocides needed for the particular conditions of a given application. A significant disadvantage is that even when the exact biocides are determined, it is oftentimes cost prohibitive to use the biocide blend. Thus, sacrifices are commonly made in using a single biocide instead of a blend and having to choose which desirable properties are most important. As a result, not all of the problems associated with microbial growth can be addressed. By way of example, a glutaraldehyde/4,4-dimethyloxazolidine blend may collectively possess all the desired properties but may be cost prohibitive to use.

Another disadvantage to biocide blends is that typically only one of the biocides in the blend possesses a desired property. By way of example, if maintaining biocidal activity in high salinity fluids is crucially important and only one of the biocides in the blend possesses this property, then the effectiveness of the biocide blend as a whole is reduced compared to a biocide blend wherein both of the biocides possessed this property.

Yet another disadvantage to biocide blends is the length of time of biocidal activity. By way of example, if the biocide loses biocidal activity in a matter of days, then oftentimes retreatment is required to prevent microbial growth. Therefore, there is a need for new and improved biocide blends that overcome these challenges and disadvantages.

It has been discovered that a biocide blend can be used in a variety of wellbore conditions and treatment fluids. The biocide blend can possess all the desired properties needed for a variety of wellbore treatment operations. The biocide blend can also maintain biocidal activity for longer periods of time compared to other biocide blends.

According to any of the embodiments, a method of treating a portion of a subterranean formation comprises: introducing a treatment fluid into the portion of the subterranean formation, wherein the treatment fluid comprises: a base fluid; and a biocide blend comprising: a first biocide, wherein the first biocide is a formaldehyde-releasing biocide; and a second biocide, wherein the second biocide is a quaternary ammonium compound, wherein each of the first biocide and the second biocide possess a first property and a second property, wherein the first property is the same, and wherein the second property is different.

According to any of the embodiments, a biocide blend for treating a portion of a wellbore comprises: a first biocide, wherein the first biocide is a formaldehyde-releasing biocide; and a second biocide, wherein the second biocide is a quaternary ammonium compound, wherein each of the first biocide and the second biocide possess a first property and a second property, wherein the first property is the same, and wherein the second property is different.

It is to be understood that the discussion of any of the embodiments regarding the fluids and devices is intended to apply to all of the system and method embodiments without the need to repeat the various embodiments throughout.

The biocide blend includes at least two different biocides. The biocide blend can further include a third biocide, a fourth biocide, and so on. The biocide blend includes a first biocide. The first biocide is a formaldehyde-releasing biocide. The first biocide can be any substance that naturally releases formaldehyde. The release of formaldehyde can be a result of decomposition of the first biocide. The release of formaldehyde can also occur when the first biocide is added to an aqueous liquid. Without being limited by theory, it is believed that temperature can also play a role in the release of formaldehyde and/or the rate of decomposition of the first biocide that releases formaldehyde.

The formaldehyde that is released interacts with microorganisms and kills bacteria—including spores—and viruses. Accordingly, the released formaldehyde is an effective tool to combat microbial growth in a wellbore. The formaldehyde may be released slowly over time; for example, over a 9-month period or longer. Accordingly, the formaldehyde-releasing biocide is not generally considered to be a "quick kill" biocide.

According to any of the embodiments, the formaldehyde-releasing biocide can be a triazine compound. It is to be understood that other formaldehyde-releasing biocides can be used and triazine is but one, non-limiting example. As used herein, "triazine" is a class of nitrogen-containing heterocycle compounds. Triazine has three isomers based on the location of the nitrogen atoms on the heterocyclic ring. The three isomers of triazine are shown below.

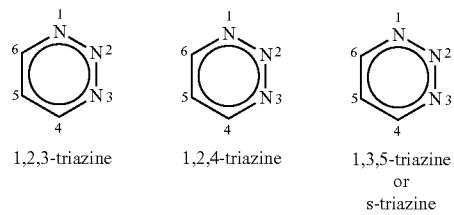

The triazine for the biocide blend can be 1,2,3-triazine or 1,2,4-triazine or 1,3,5-triazine. The triazine can further include one or more substituents. A substituent is one atom or a group of atoms that replaces one or more hydrogen atoms on the parent chain of a hydrocarbon. The substituents can be selected from a chloride ion (Cl$^-$), oxygen (O), sulfur (S), sodium (Na), an amino group (NH$_2$), an alcohol group (OH), a thiol group (SH), a carbonyl group (C=O), a methoxy group (O—CH$_3$), a thioxo group (C=S), a methyl group (C—CH$_3$), a carboxylate group (COOH), a trifluoromethyl group (CF$_3$), cyclic compounds such as phenyl groups, and combinations thereof.

Non-limiting examples of suitable triazines include: cyanuric chloride; trichloroisocyanuric acid; 1,3,5-triazine-2,4,6-trithiol trisodium salt solution; trithiocyanuric acid trisodium salt hydrate; 2-amino-4,6-dichloro-1,3,5-triazine; s-triazine; cyanuric acid; trithiocyanuric acid; 2-chloro-4,6-diamino-1,3,5-triazine; 3-amino-1,2,4-triazine; 5-azacytosine; melamine; oxonic acid potassium salt; 2,4-dichloro-6-methoxy-1,3,5-triazine; [1,2,4]triazolo[1,5-a][1,3,5]triazin-7-amine; 5-methoxy-1,2,3-triazine; tetrahydro-2-methyl-3-thioxo-1,2,4-triazine-5,6-dione; 4-(methylthio)-1,3,5-triazin-2-amine; 6-methyl-1,3,5-triazine-2,4-diamine;

6-chloro[1,2,4]triazolo[4,3-b]pyridazine; methyl 1,2,3-triazine-4-carboxylate; 2-chloro-4,6-dimethoxy-1,3,5-triazine; 3-amino-5,6-dimethyl-1,2,4-triazine; 2-amino-4-methoxy-6-methyl-1,3,5-triazine; 2,4,6-tris(trifluoromethyl)-1,3,5-triazine; 2,4,6-trimethoxy-1,3,5-triazine; N-cyclopropyl-2,4,6-triamino-1,3,5-triazine; 2-amino-4-ethoxy-6-(methylamino)-1,3,5-triazine; 1,2,3-benzotriazin-4(3H)-one; 4-(1-pyrrolidinyl)-1,3,5-triazin-2-amine; 4-(4-morpholinyl)-1,3,5-triazin-2-amine; 2-amino-4-chloro-6-phenyl-1,3,5-triazine; 5-phenyl-1,2,3-triazine; 2,4-diamino-6-phenyl-1,3,5-triazine; diethyl 1,2,3-triazine-4,6-dicarboxylate; 1,3,5-tris(2-hydroxyethyl)isocyanurate; 2,4,6-tris(dimethylamino)-1,3,5-triazine; 2,4-diamino-6-[3-(trifluoromethyl)phenyl]-1,3,5-triazine; 2,4-diamino-6-(4-methylphenyl)-1,3,5-triazine; 2,4-diamino-6-(4-methoxyphenyl)-1,3,5-triazine; 7-methyl-3,7,11-triazaspiro[5.6]dodecan-12-one; 1,9-dimethyl-1,4,9-triazaspiro[5.5]undecane trihydrochloride; tris(2,3-dibromopropyl) isocyanurate; 1,3,5-triallyl-1,3,5-triazine-2,4,6(1H,3H,5H)-trione; triethyl 1,3,5-triazine-2,4,6-tricarboxylate; 3-(2-pyridyl)-5,6-diphenyl-1,2,4-triazine; 2,4,6-triphenyl-1,3,5-triazine; 2,4,6-triphenoxy-1,3,5-triazine; and 1,3,5-tribenzylhexahydro-1,3,5-triazine.

The biocide blend also includes a second biocide. The second biocide is a quaternary ammonium compound (QAC). The quaternary ammonium compound can be a cationic surfactant. A surfactant is an amphiphilic molecule comprising a hydrophobic tail group and a hydrophilic head group. The hydrophilic head can be charged. A cationic surfactant includes a positively charged head. An anionic surfactant includes a negatively charged head. A zwitterionic surfactant includes both a positively and negatively charged head. A surfactant with no charge is called a non-ionic surfactant.

QACs typically function as a biocide by impacting the cell walls and membranes of a microorganism, oftentimes after relatively long contact times. The quaternary ammonium compound's permanent positive charge makes it bind readily to the negatively charged surface of most microbes. QACs are generally very stable, mostly unaffected by pH levels, and can maintain biocidal activity for extended periods of time. The QAC is considered a surface-active agent and can assist the released formaldehyde from the formaldehyde-releasing biocide to contact microbes. Accordingly, the formaldehyde-releasing biocide and the quaternary ammonium compound can independently function as a biocide and can also work in conjunction to improve biocidal functionality over the individual biocides.

The quaternary ammonium compound is quaternized. A quaternary compound is a cation consisting of a central positively charged atom (nitrogen) with four substituents ($R_1$, $R_2$, $R_3$, and $R_4$), commonly organic alkyl or aryl groups, that discount hydrogen atoms. According to any of the embodiments, the quaternary ammonium compound has one nitrogen atom that is quaternized. The agents used to quaternize the quaternary ammonium compound can vary. Non-limiting examples include methyl-, ethyl-, or benzyl-quaternization agents with $Cl^-$, $Br^-$, or $SO_4^-$ counter-anion(s) ($X^-$). A general formula for the quaternary ammonium compound is provided below.

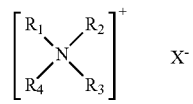

Alkyl chain lengths of the QAC can vary and can be selected to provide a higher biocidal activity. The alkyl chain lengths can range from $C_{12}$ to $C_{22}$. Examples of suitable quaternary ammonium compounds include, but are not limited to, alkyldimethylbenzylammonium chloride (ADBAC) and didecyldimethylammonium chloride (DDAC). A representative chemical formula for ADBAC is $[CH_3(CH_2)_n N(CH_3)_2CH_2C_6H_5]^+Cl^-$ wherein n is between 12 and 16. A representative molecular formula for DDAC is $C_{22}H_{48}ClN$.

A biocide can possess a variety of desirable properties. Some of the desirable properties can include maintaining biocidal activity in fluids having a high salinity or a high concentration of total dissolved solids, thermal stability, maintaining biocidal activity in the presence of ammonia or primary amines, quick kill, maintaining biocidal activity for extended periods of time—also known as persistence, and no interaction between the biocide and other additives having a negative charge (anions) within a treatment fluid.

The first biocide and the second biocide can possess at least a first property and a second property, wherein the first property is the same. The second property can be different. Table 1 lists the properties that a common biocide (glutaraldehyde), triazine, and a quaternary ammonium compound (QAC) possess as well as the properties of a glutaraldehyde/QAC biocide blend and a triazine/QAC biocide blend. It is to be understood that unlike a triazine compound, glutaraldehyde is not a formaldehyde-releasing biocide.

TABLE 1

| | Biocide or blend | | | | |
|---|---|---|---|---|---|
| Property | Glutaraldehyde | QAC | Triazine | Glutaraldehyde/ QAC blend | Triazine/ QAC blend |
| High salinity activity | Yes | No | Yes | Yes | Yes |
| Activity in ammonia | No | Yes | Yes | Yes | Yes |
| Quick kill | Yes | Yes | No | Yes | Yes |
| Persistence | No | Yes | Yes | Yes | Yes |
| No interaction with anions | Yes | No | Yes | Yes | Yes |
| Thermal stability | No | Yes | Yes | Yes | Yes |

The effectiveness of a biocide blend can be dictated by which properties of the two biocides are the same and which properties are different. By way of example, if the biocide blend is to be used in a wellbore having ammonia or primary amines present, then a biocide blend containing two biocides that both possess activity in the presence of ammonia will generally be more effective compared to a blend wherein only one of the two biocides possesses this property. By way of another example, if the biocide blend is to be used in a wellbore having higher temperatures, then a biocide blend containing two biocides that both possess thermal stability will generally be more effective compared to a blend wherein only one of the two biocides possesses this property.

As can be seen in Table 1, the only property that is the same for glutaraldehyde and the QAC is quick kill. By contrast, triazine and QAC have three properties that are the same—namely, activity in the presence of ammonia, persistence, and thermal stability. Without being limited by theory, it is believed that as the number of shared properties of the first biocide and second biocide increase, the effectiveness of the biocide blend also increases. Accordingly, a blend of a formaldehyde-releasing biocide and a quaternary ammonium compound is believed to be more effective in a wellbore environment than a glutaraldehyde/QAC blend.

According to any of the embodiments, the first property that is the same can be thermal stability. The first property can also be persistence in the wellbore. The first property can also be maintaining biocidal activity in the presence of ammonia. Each of the first and second biocides can possess more than the first and second properties; for example, a third, fourth, fifth, sixth, etc. property. According to any of the embodiments, each of the first biocide and the second biocide can possess more than one property that is the same; for example, a third property, a fourth property, etc. According to any of the embodiments, every one of the desired properties is possessed by the first biocide, by the second biocide, or by both the first biocide and the second biocide. In this manner, all of the desired properties are exhibited by the biocide blend. It is to be understood that the first biocide does not need to possess all of the desired properties and the second biocide does not need to possess all of the desired properties, but all of the desired properties should be possessed by at least one of the first and second biocides or the combination.

According to any of the embodiments, the first biocide, the second biocide, or both the first and second biocides can maintain biocidal activity for a desired period of time. The desired period of time can be at least 3 months, at least 6 months, at least 9 months, or greater than 9 months. At least 75% by weight of the first biocide, the second biocide, or both the first and second biocides can be thermally stable at a temperature less than or equal to 275° F. (135° C.). At least 25% by weight of the first biocide, the second biocide, or both the first and second biocides are thermally stable at a temperature less than or equal to 392° F. (200° C.). Preferably, the weight percentage of the first biocide and/or the second biocide are thermally stable at the stated temperatures for the desired period of time. In this manner, biocidal activity is maintained for extended periods of time at temperatures commonly encountered in wellbore environments. The wellbore environment conditions can be controlled (e.g., the temperature of the treatment fluid or concentration of the biocide blend in the base fluid) to provide a slow release of formaldehyde from the formaldehyde-releasing biocide. Moreover, the quaternary ammonium compound can be selected such that biocidal activity of the QAC is maintained for the desired period of time.

The methods according to any of the embodiments can include introducing a treatment fluid into a portion of a subterranean formation. The treatment fluid can be a fluid used to perform an oil and gas treatment operation. The treatment operation can be, for example, a hydraulic fracturing operation or a shut-in operation. The treatment fluid can be, without limitation, a drilling fluid, a spacer fluid, a completion fluid, a work-over fluid, a stimulation fluid (e.g., a fracturing fluid or acidizing fluid), a packer fluid, a shut-in fluid, or a cement composition. The wellbore treatment fluid can be any fluid used to treat at least a portion of a well or subterranean formation. The biocide blend can be added to any treatment fluid used to control microbial growth of aerobic or anaerobic bacteria.

The treatment fluid includes a base fluid. The base fluid can include water. The water can be selected from the group consisting of freshwater, brackish water, saltwater, and any combination thereof. The base fluid can further include a water-soluble salt. The salt can be selected from the group consisting of sodium chloride, calcium chloride, calcium bromide, potassium chloride, potassium bromide, potassium formate, magnesium chloride, sodium bromide, cesium formate, cesium acetate, and any combination thereof. The base fluid can include a high concentration of total dissolved solids (TDS); for example, concentrations ranging from 500 to 300,000 milligrams per liter "mg/L". Total dissolved solids are the total amount of mobile charged ions, including minerals, salts, or metals dissolved in a given volume of water and expressed in units of mg/L. According to any of the embodiments, the first biocide, the second biocide, or both the first and second biocides maintain biocidal activity in a fluid having a TDS concentration less than or equal to 200,000 mg/L.

The base fluid can also include a hydrocarbon liquid. As used herein, the phrase "hydrocarbon liquid" means a pure hydrocarbon liquid or a hydrocarbon-containing liquid. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. The saturated hydrocarbon can be an alkane or paraffin. Preferably, the saturated hydrocarbon is an alkane. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The treatment fluid includes the biocide blend. The first and second biocides can be pre-mixed and stored prior to being added to the base fluid to form the treatment fluid. Formaldehyde is not considered to be thermally stable. Accordingly, it is preferred that the formaldehyde-releasing biocide releases none to very little (i.e., less than 10% v/v of the first biocide) formaldehyde prior to introduction of the treatment fluid into the subterranean formation. According to any of the embodiments, the biocide blend can be stored at a temperature less than or equal to the degradation temperature of the formaldehyde-releasing biocide. The degradation temperature can be, for example, 86° F. (30° C.). In this manner, formaldehyde is not prematurely released prior to use.

The biocide blend can include a fluid, the first biocide, and the second biocide. To prevent premature release of formaldehyde, the biocide blend can be a concentrate that includes less than 70%, less than 60%, or less than 50% water by weight of the biocide blend. A concentrate with a low concentration of water can prevent the formaldehyde-releasing biocide from prematurely releasing formaldehyde prior to use. The concentration of the formaldehyde-releasing biocide in the biocide blend can be in the range of 150 to 350 grams per liter of the fluid (g/L). The concentration of the quaternary ammonium compound in the biocide blend can be in the range of 150 to 350 g/L. The fluid can be water, a hydrocarbon liquid, or combinations thereof. The ratio of the formaldehyde-releasing biocide to the quaternary ammonium compound in the biocide blend can range from 70:30 to 30:70.

According to any of the embodiments, the formaldehyde-releasing biocide releases formaldehyde after the biocide blend is added to the base fluid of the treatment fluid. The formaldehyde-releasing biocide can also release formaldehyde prior to, during, or after introduction of the treatment fluid into the subterranean formation. The temperature of the treatment fluid can be adjusted such that degradation of the formaldehyde-releasing biocide that releases formaldehyde occurs after introduction into the subterranean formation. By way of example, the treatment fluid can be at a temperature less than or equal to the degradation temperature of the formaldehyde-releasing biocide. The temperature of the portion of the subterranean formation can be greater than the temperature of the treatment fluid and greater than or equal to the degradation temperature of the formaldehyde-releasing biocide. In this manner, the formaldehyde-releasing biocide can begin degrading, which causes release of formaldehyde, after placement into the portion of the subterranean formation to be treated with the treatment fluid.

The concentration of the biocide blend in the base fluid of the treatment fluid can be in the range of 5 to 300 (parts per million "ppm"). The formaldehyde-releasing biocide may be a hydrogen sulfide ($H_2S$) scavenger, whereby the released formaldehyde may first function to scavenge any hydrogen sulfide present in the portion of the subterranean formation before functioning as a biocide. If hydrogen sulfide is present in the portion of the subterranean formation to be treated, and depending on the concentration of hydrogen sulfide, the concentration of the formaldehyde-releasing biocide in the base fluid may need to be increased to provide the desired microbial growth control. A separate hydrogen sulfide scavenger can also be included in the biocide blend or included in the treatment fluid to scavenge the hydrogen sulfide, thereby allowing most or all of the formaldehyde-releasing biocide to function as a biocide.

Fluid from the portion of the subterranean formation that is being treated with the treatment fluid can be periodically analyzed to determine if microbial growth is occurring; for example, by testing for the presence and concentration of hydrogen sulfide. If microbial growth is detected, then a second treatment fluid containing the biocide blend can be introduced into the portion of the subterranean formation. These embodiments can be useful when the first and second biocides of the biocide blend lose biocidal activity; for example, due to the time the biocides have been within the subterranean formation.

The treatment fluid can include other additives in addition to the base fluid and the biocide blend. The other additives can be, for example, proppant, cement, foaming agents, or defoaming agents. The other additives can be selected depending on the specific treatment operation to be performed.

It is to be understood that while the treatment fluid can contain other ingredients, it is the biocide blend that is primarily or wholly responsible for providing microbial growth control. For example, a test treatment fluid consisting essentially of, or consisting of, the base fluid and the biocide blend and in the same proportions as the treatment fluid can have a desirable microbial growth control. Therefore, it is not necessary for the treatment fluid to include other additives, such as other biocides, to provide the desired microbial growth control. It is also to be understood that any discussion related to a "test treatment fluid" is included for purposes of demonstrating that the treatment fluid can contain other ingredients, but it is the biocide blend that creates the desired microbial growth control. Therefore, while it may not be possible to perform a test in a wellbore for the specific treatment fluid, one can formulate a test treatment fluid to be tested in a laboratory to identify if the ingredients and concentration of the ingredients will provide the desired microbial growth control.

An embodiment of the present disclosure is a method of treating a portion of a subterranean formation comprising: introducing a treatment fluid into the portion of the subterranean formation, wherein the treatment fluid comprises: a base fluid; and a biocide blend comprising: a first biocide, wherein the first biocide is a formaldehyde-releasing biocide; and a second biocide, wherein the second biocide is a quaternary ammonium compound, wherein each of the first biocide and the second biocide possess a first property, and wherein the first property is the same. Optionally, the method further comprises wherein the first biocide is a triazine compound. Optionally, the method further comprises wherein the triazine compound further comprises one or more substituents, wherein the one or more substituents are selected from the group consisting of a chloride ion, oxygen, sulfur, sodium, an amino group, an alcohol group, a thiol group, a carbonyl group, a methoxy group, a thioxo group, a methyl group, a carboxylate group, a trifluoromethyl group, a cyclic compound, and combinations thereof. Optionally, the method further comprises wherein the quaternary ammonium compound has one nitrogen atom that is quaternized. Optionally, the method further comprises wherein the quaternary ammonium compound comprises one or more alkyl chains, and wherein the alkyl chain length ranges from $C_{12}$ to $C_{22}$. Optionally, the method further comprises wherein the quaternary ammonium compound is selected from alkyldimethylbenzylammonium chloride or didecyldimethylammonium chloride. Optionally, the method further comprises wherein the first property is thermal stability. Optionally, the method further comprises wherein at least 75% by weight of the first biocide and the second biocide are thermally stable at a temperature less than or equal to 135° C. Optionally, the method further comprises wherein the first biocide, the second biocide, or both the first biocide and the second biocide maintain biocidal activity for at least 6 months. Optionally, the method further comprises wherein the first biocide, the second biocide, or both the first biocide and the second biocide possess all of a set of desirable properties selected from maintaining biocidal activity in fluids having a total dissolved solids concentration in the range of 500 to 300,000 milligrams per liter, thermal stability, maintaining biocidal activity in the presence of ammonia or primary amines, quick kill, persistence, and no interaction with anionic additives. Optionally, the method further comprises wherein the first biocide and the second biocide possess a second property, and wherein the second property is the same. Optionally, the method further comprises wherein the base fluid comprises water, and wherein the water is selected from the group consisting of freshwater, brackish water, saltwater, and any combination thereof. Optionally, the method further comprises wherein the ratio of the first biocide to the second biocide in the biocide blend ranges from 70:30 to 30:70. Optionally, the method further comprises adding the biocide blend to the base fluid prior to introduction into the portion of the subterranean formation. Optionally, the method further comprises storing the biocide blend prior to adding the biocide blend to the base fluid, wherein the biocide blend is stored at a temperature less than or equal to the degradation temperature of the formaldehyde-releasing biocide. Optionally, the method further comprises wherein the formaldehyde-releasing biocide releases less than 10% volume formaldehyde per volume of the formaldehyde-releasing biocide prior to introduction of the treatment fluid into the subterranean formation. Optionally, the method further comprises wherein the treatment fluid further comprises a hydrogen sulfide scavenger. Optionally, the method further comprises wherein the biocide blend is in a concentration in the range of 5 to 300 parts per million of the base fluid.

Another embodiment of the present disclosure is a biocide blend for treating a portion of a wellbore comprising: a first biocide, wherein the first biocide is a formaldehyde-releasing biocide; and a second biocide, wherein the second biocide is a quaternary ammonium compound, wherein each of the first biocide and the second biocide possess a first property, and wherein the first property is the same. Optionally, the biocide blend further comprises wherein the first biocide is a triazine compound. Optionally, the biocide blend further comprises wherein the triazine compound further comprises one or more substituents, wherein the one or more substituents are selected from the group consisting of a chloride ion, oxygen, sulfur, sodium, an amino group, an alcohol group, a thiol group, a carbonyl group, a methoxy group, a thioxo group, a methyl group, a carboxylate group, a trifluoromethyl group, a cyclic compound, and combinations thereof. Optionally, the biocide blend further comprises wherein the quaternary ammonium compound has one nitrogen atom that is quaternized. Optionally, the biocide blend further comprises wherein the quaternary ammonium compound comprises one or more alkyl chains, and wherein the alkyl chain length ranges from $C_{12}$ to $C_{22}$. Optionally, the biocide blend further comprises wherein the quaternary ammonium compound is selected from alkyldimethylbenzylammonium chloride or didecyldimethylammonium chloride. Optionally, the biocide blend further comprises wherein the first property is thermal stability. Optionally, the biocide blend further comprises wherein at least 75% by weight of the first biocide and the second biocide are thermally stable at a temperature less than or equal to 135° C. Optionally, the biocide blend further comprises wherein the first biocide, the second biocide, or both the first biocide and the second biocide maintain biocidal activity for at least 6 months. Optionally, the biocide blend further comprises wherein the first biocide, the second biocide, or both the first biocide and the second biocide possess all of a set of desirable properties selected from: maintaining biocidal activity in fluids having a total dissolved solids concentration in the range of 500 to 300,000 milligrams per liter, thermal stability, maintaining biocidal activity in the presence of ammonia or primary amines, quick kill, persistence, and no interaction with anionic additives. Optionally, the biocide blend further comprises wherein the first biocide and the second biocide possess a second property, and wherein the second property is the same. Optionally, the biocide blend further comprises wherein the ratio of the first biocide to the second biocide in the biocide blend ranges from 70:30 to 30:70.

Examples

To facilitate a better understanding of the various embodiments, the following examples are given. The data results that are represented in the figures demonstrate standard microbial kill testing. Kill testing was performed at 32° C. (89.6° F.) at various contact times as follows. Bacterial populations were augmented prior to testing by culturing indigenous acid producing bacteria (APB) and sulfate reducing bacteria (SRB) in sample waters before starting kill studies. Prior to testing, cultures of APB and SRB from water samples were grown in culture medium. APB were grown in anaerobic phenol red dextrose medium (PRD). SRB were grown in American Petroleum Institute (API) medium without iron. The total dissolved solids (TDS) of SRB and APB media were selected to simulate wellbore fluids for some of the testing. Immediately preceding biocide testing, cultures were harvested by centrifugation. Cell pellets from mature bacteria were resuspended in sample water. The sample water, augmented with bacteria, was dispensed into 60 mL glass bottles and the appropriate amount of biocide was added. At the stated contact time of either 4 hours or 24 hours, biocide samples were taken for quantification. A standard serial dilution method into culture media was used to test biocide efficacy. Controls were serial diluted to theoretical extinction, while biocide-dosed samples were carried through 6 ten-fold dilutions as represented on the Y-axis of the figures. APB were quantitated by serial dilution into PRD medium. SRB were quantified by serial dilution into modified Postgate's medium B (MBP). Culture media were incubated at 32° C. (89.6° F.) and checked periodically. A change from red to yellow indicated a positive APB bottle. Formation of a black precipitate indicated a positive SRB bottle.

Figure 2:
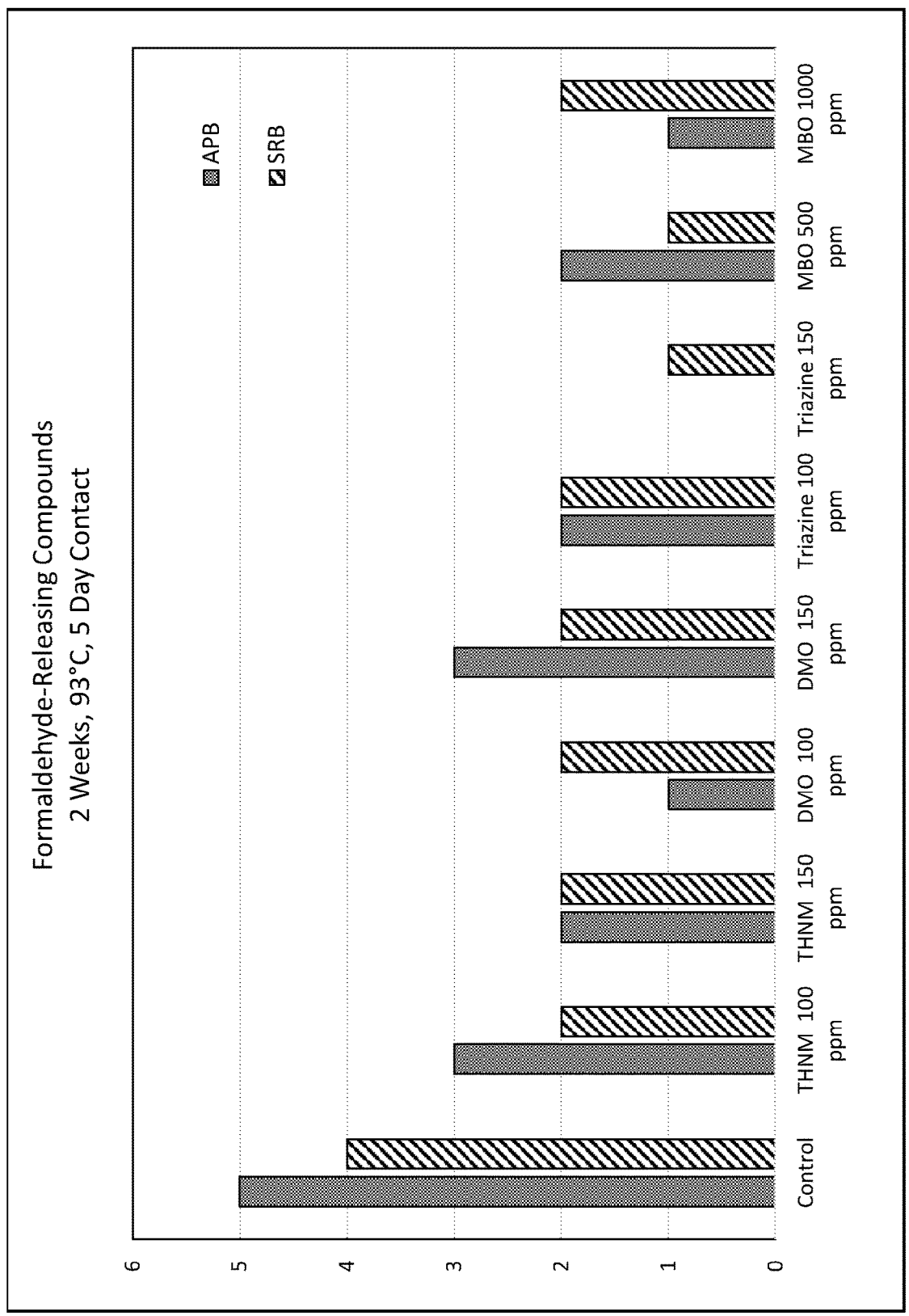

Elevated temperature studies of the biocides as shown in FIGS. 1 and 2 were conducted by adding 2 times the final biocide test concentration to 100 mL of sample water. The biocide-dosed sample was placed at 93° C. (199.4° F.) for 1 week or 2 weeks, FIG. 1 and FIG. 2, respectively. Following exposure to the elevated temperature, the heat-exposed biocide-dosed material was combined with an equal amount of sample water augmented with APB or SRB bacteria. The sample was then incubated for 5 days at 32° C. (89.6° F.). Following incubation, the sample material was serial diluted into PRD and MPB media for APB and SRB quantitation as discussed above. The biocides for FIGS. 1 and 2 are formaldehyde-releasing biocides. Tris(hydroxymethyl)nitromethane ("THNM") and 4,4-dimethyloxazolidine ("DMO") were obtained from DuPont®. Triazine was 1,3,5-triazine that is widely available commercially. Paraformaldehyde and 2-hyormaldehyde (ratio 3:2) ("MBO") was obtained from Vink chemicals. The formaldehyde-releasing biocides were in a concentration of 100, 150, 500, or 1,000 parts per million ("ppm").

As can be seen in FIG. 1, for the elevated temperature study, DMO was effective as a biocide against APB but not SRB. Triazine was effective against APB and very effective against SRB. Moreover, triazine at 100 ppm was as effective as MBO at 1,000 ppm, which is $\frac{1}{10}$ the concentration. Triazine was as effective or more effective than any of the other formaldehyde-releasing biocides at comparable or lower concentrations. As can be seen in FIG. 2, 150 ppm triazine performed better than the other formaldehyde-releasing biocides. This demonstrates that at elevated temperatures, triazine is a very effective formaldehyde-releasing biocide.

Figure 3:
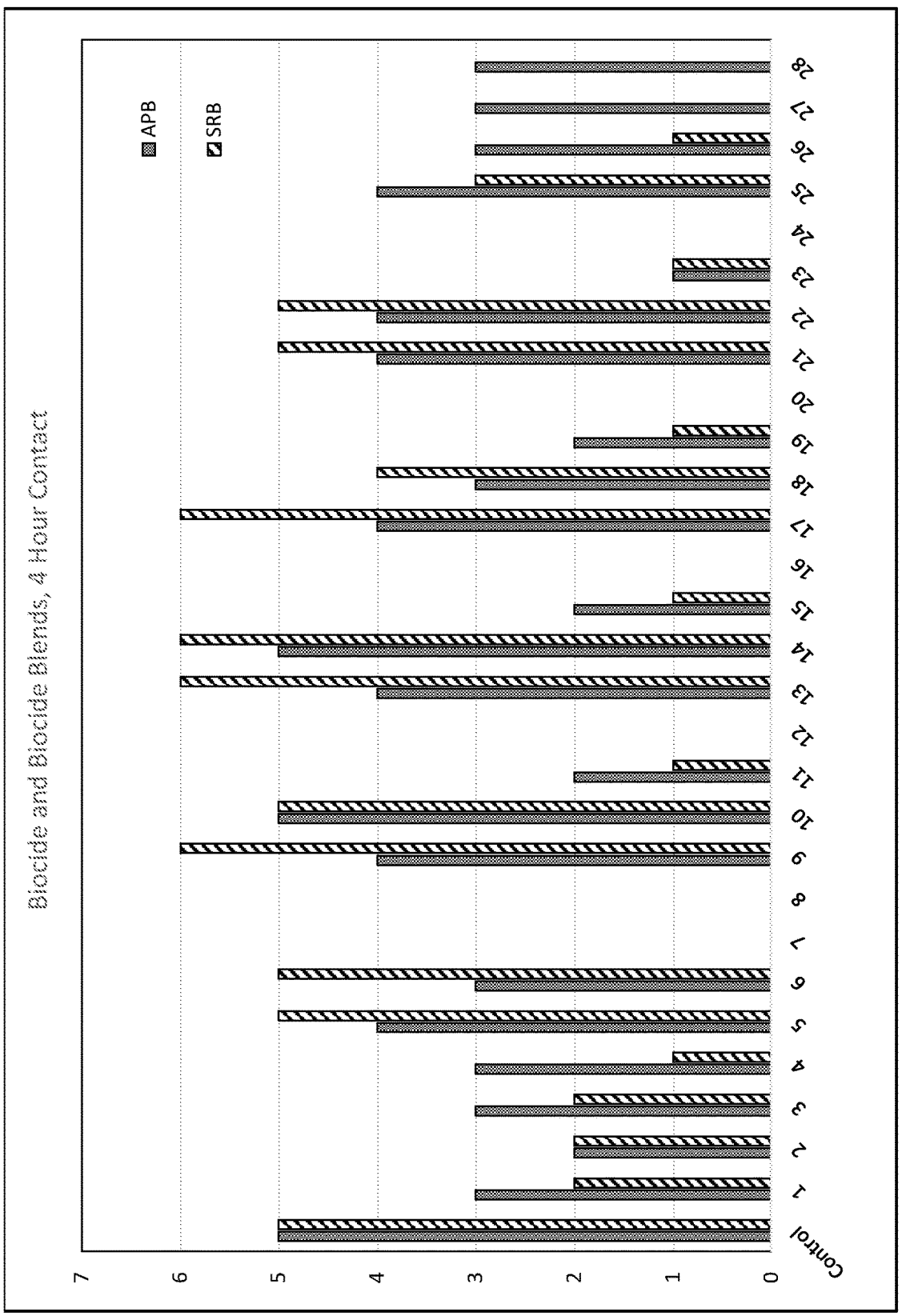
FIGS. 3 and 4 are bar graphs showing biocidal activity of different biocides and biocide blends.
Figure 4:
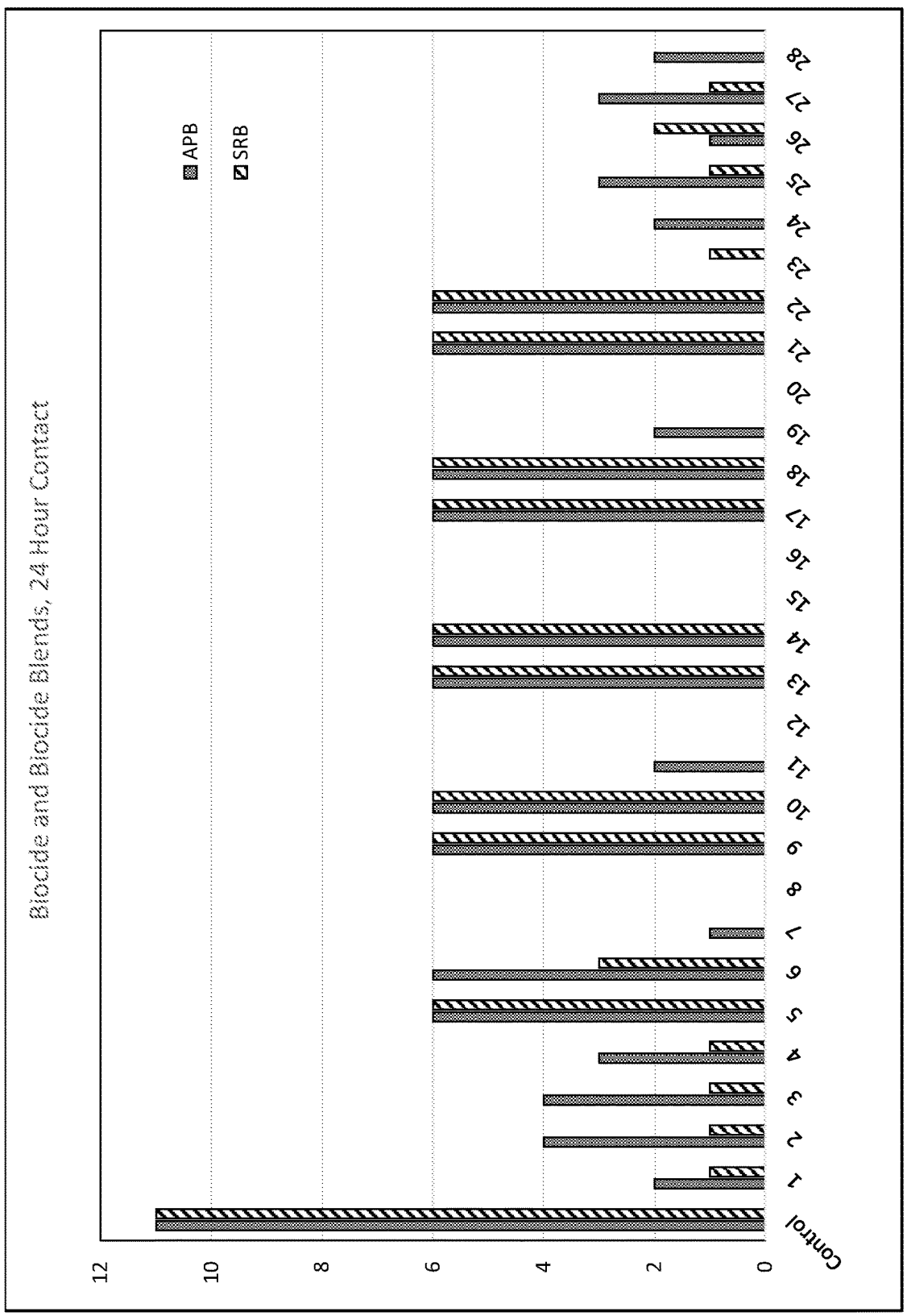
Figure 5:
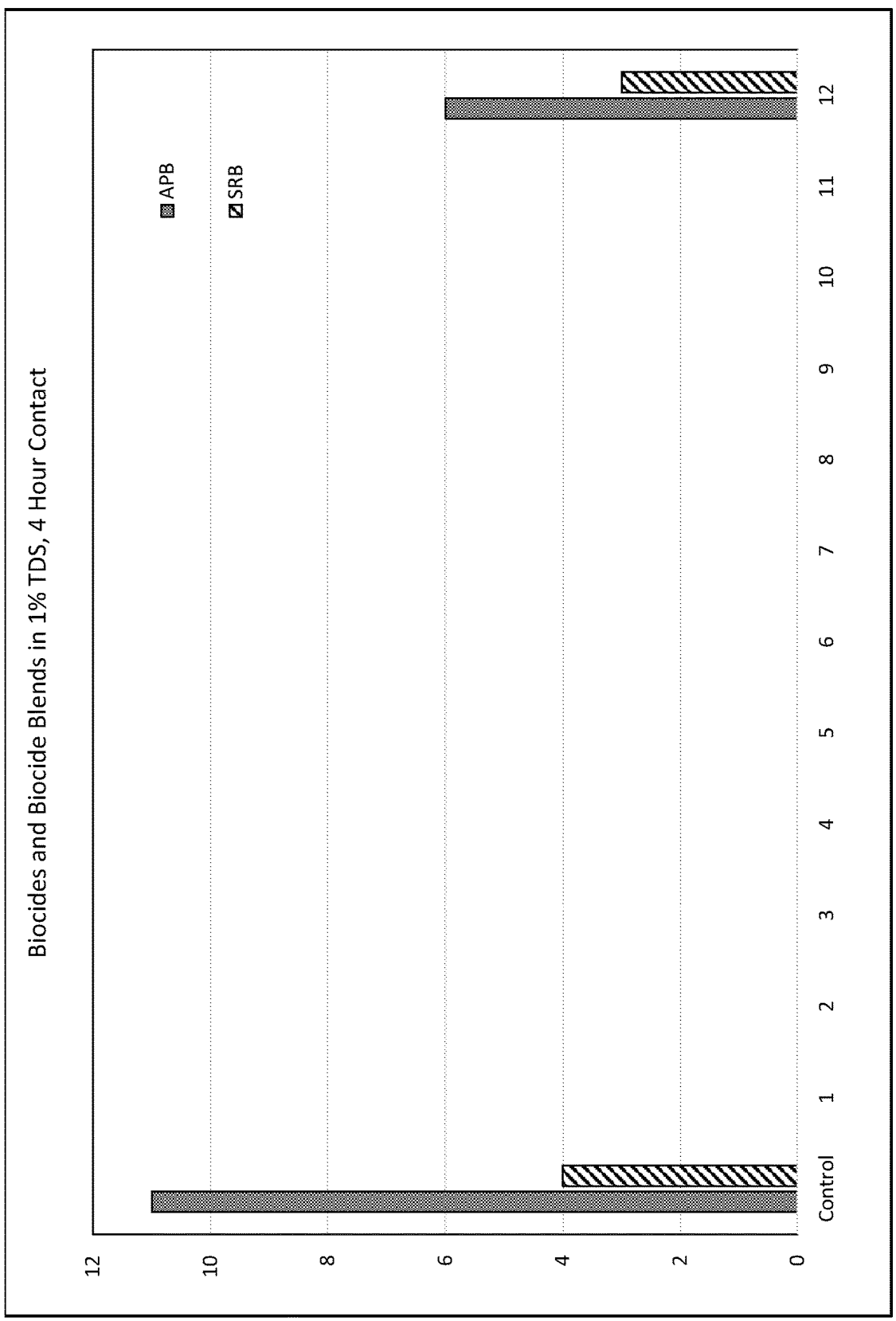
FIGS. 5-8 are bar graphs showing biocidal activity of different biocides and biocide blends in varying concentrations of total dissolved solids and varying contact times.
Figure 6:
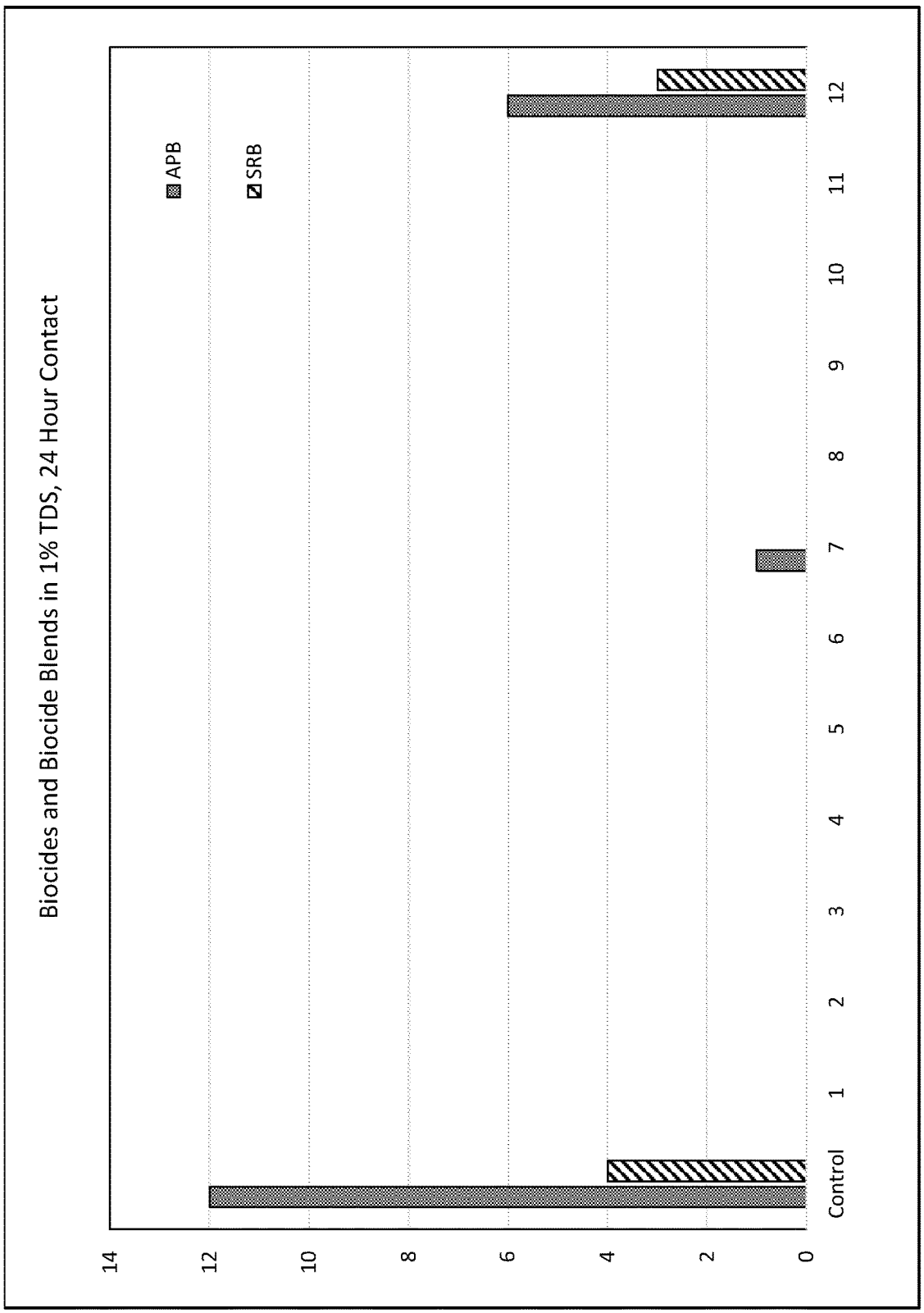
Figure 7:
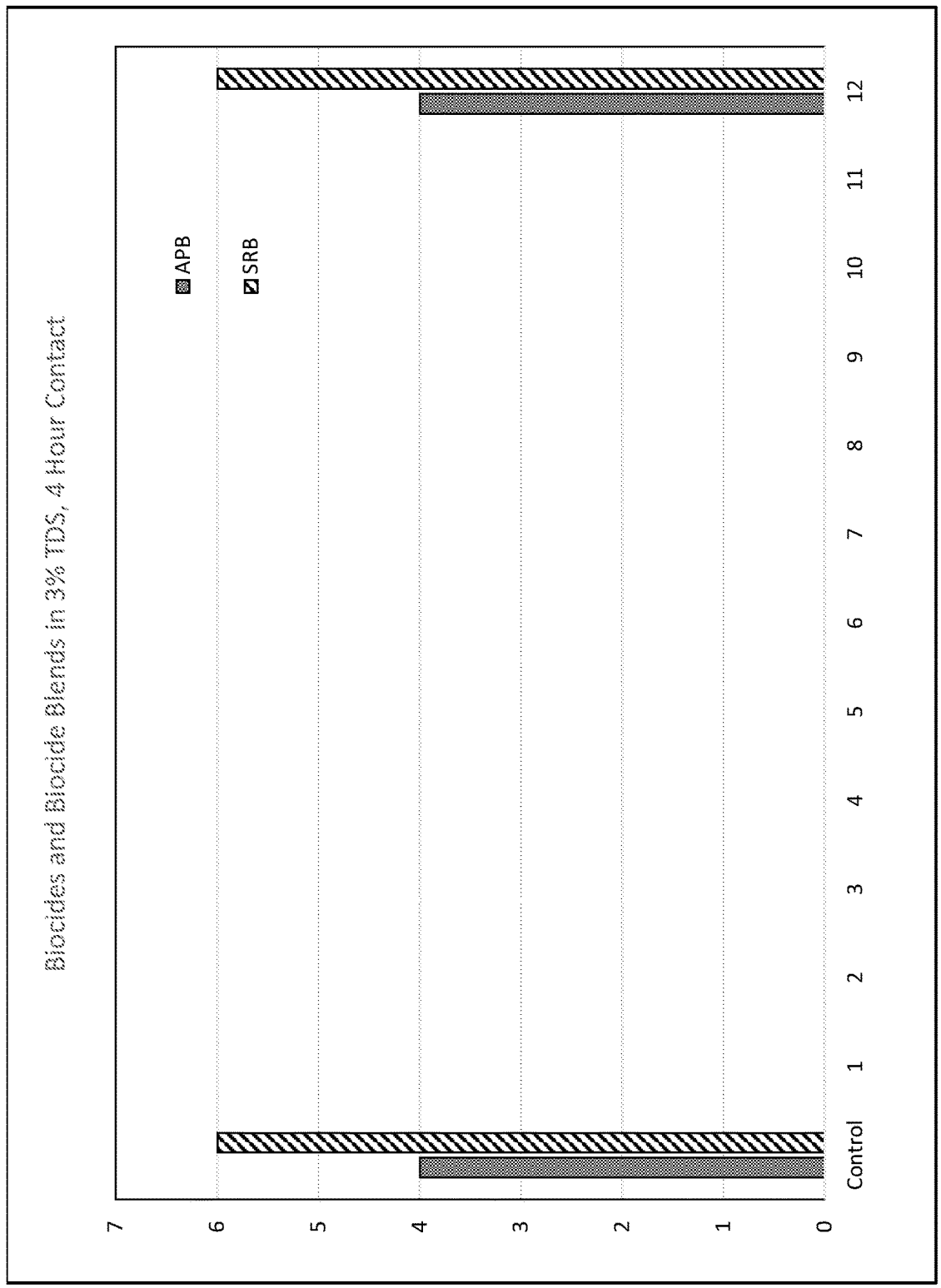
Figure 8:
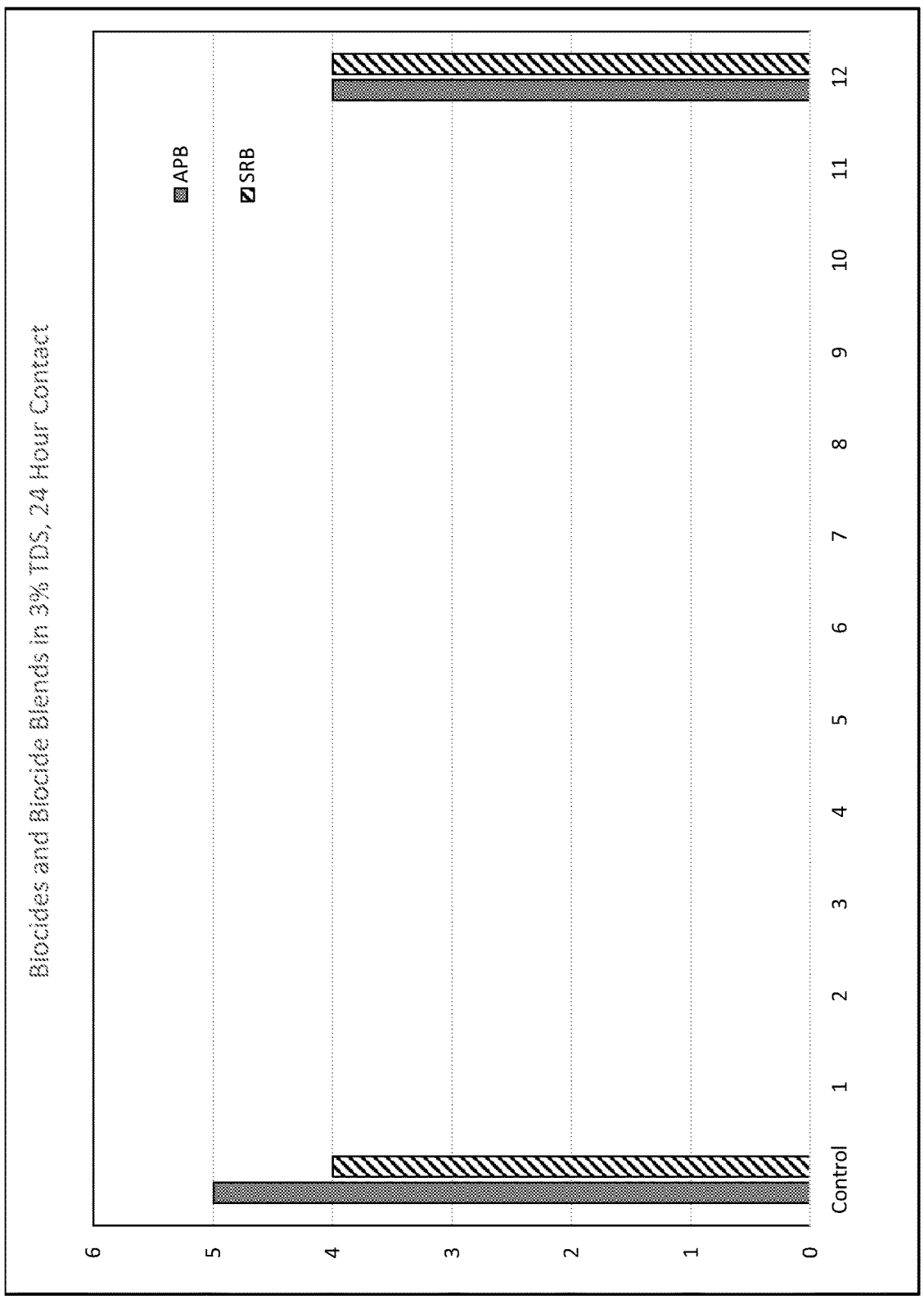
Figure 9:
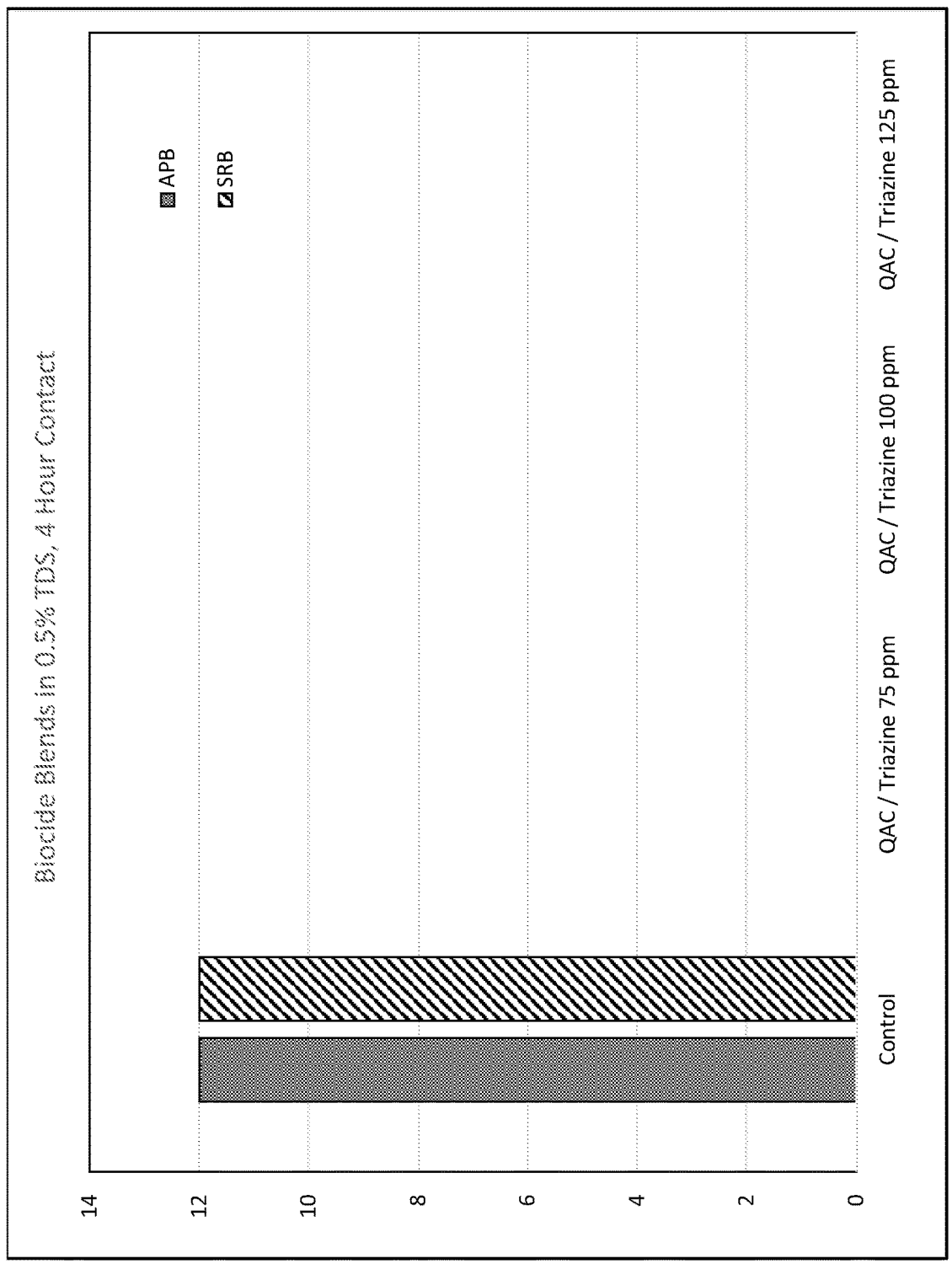
FIGS. 9-14 are bar graphs showing biocidal activity of a quaternary ammonium compound/triazine compound biocide blend at varying concentrations, varying contact times, and in varying concentrations of total dissolved solids.
Figure 10:
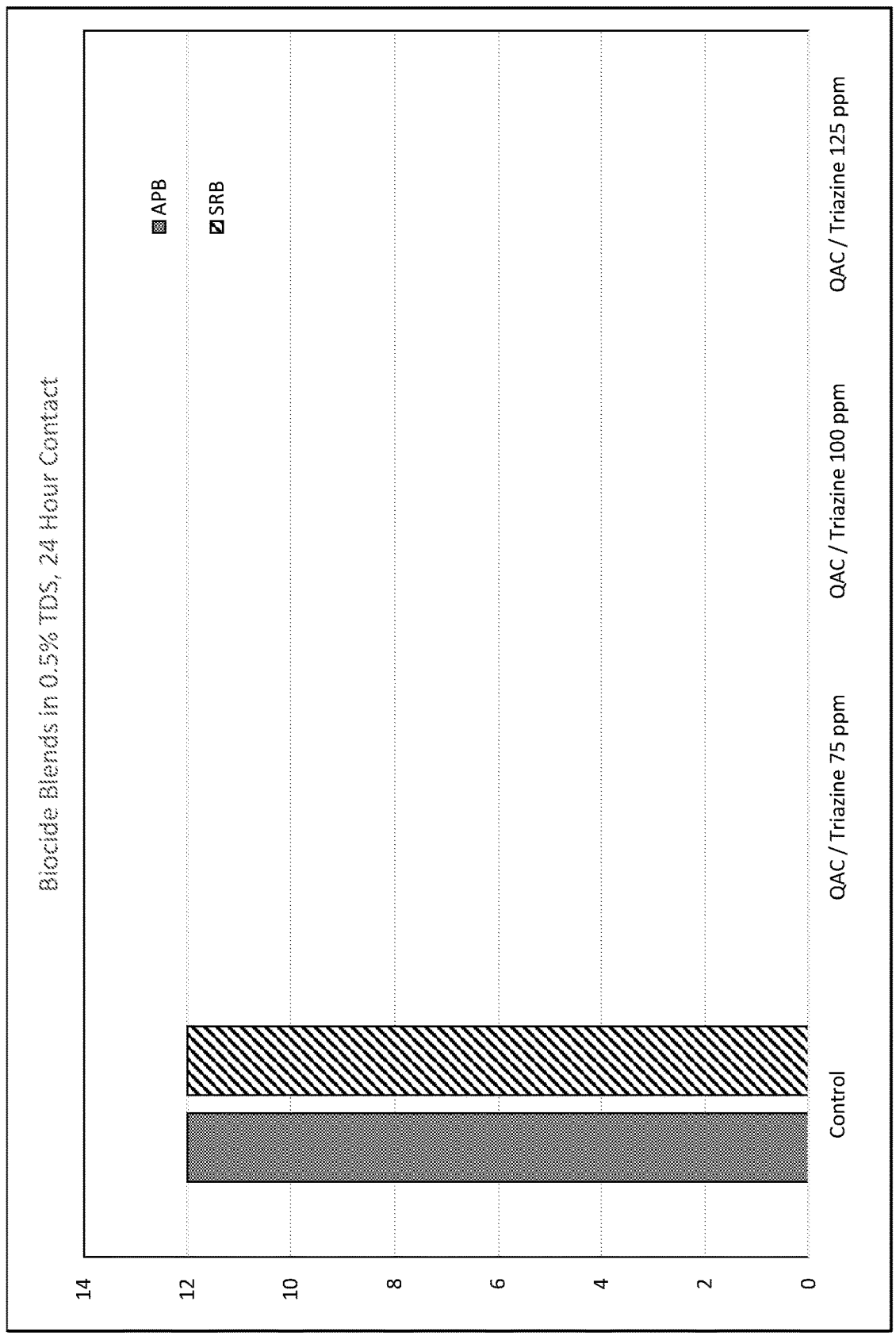
Figure 11:
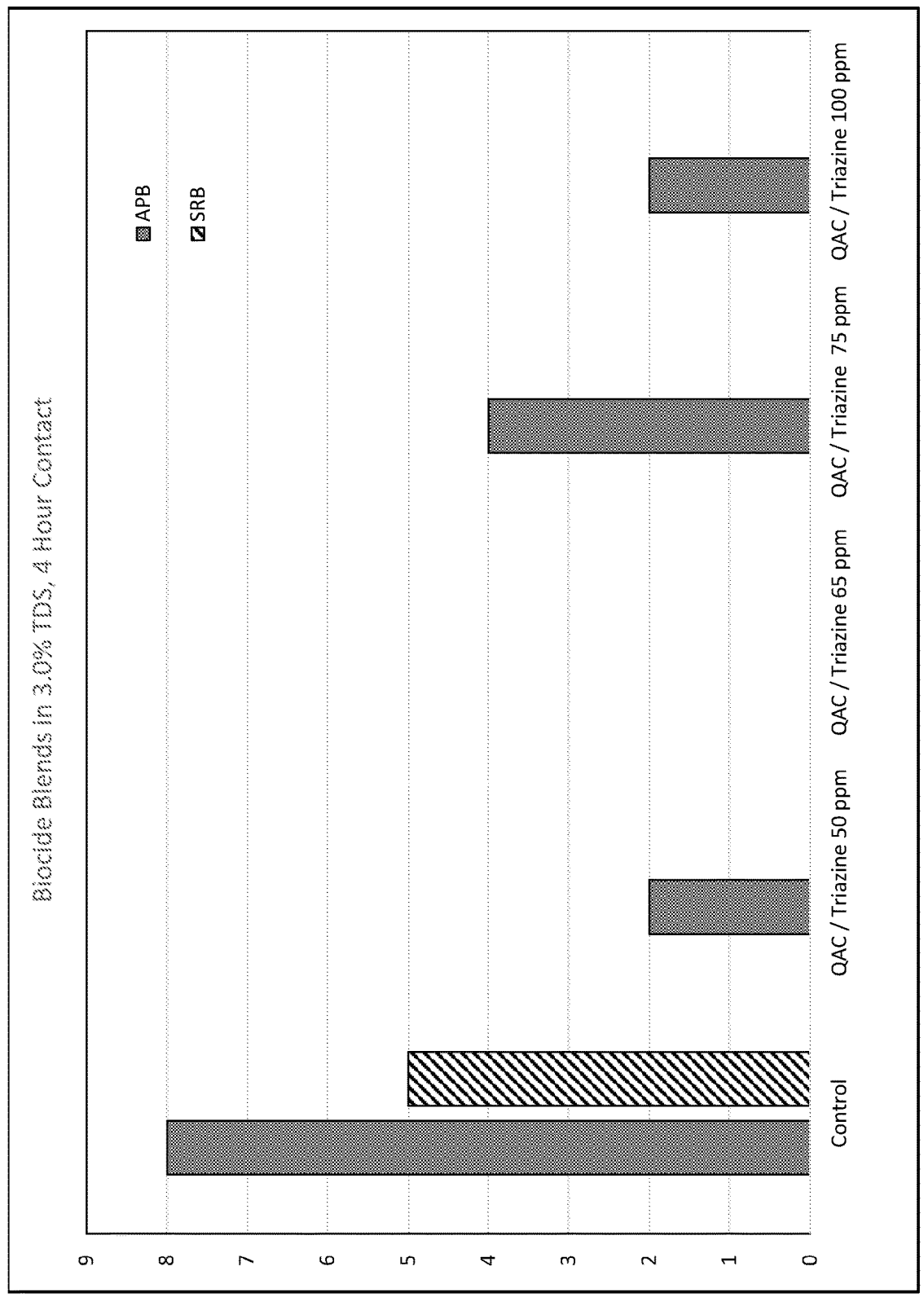
Figure 12:
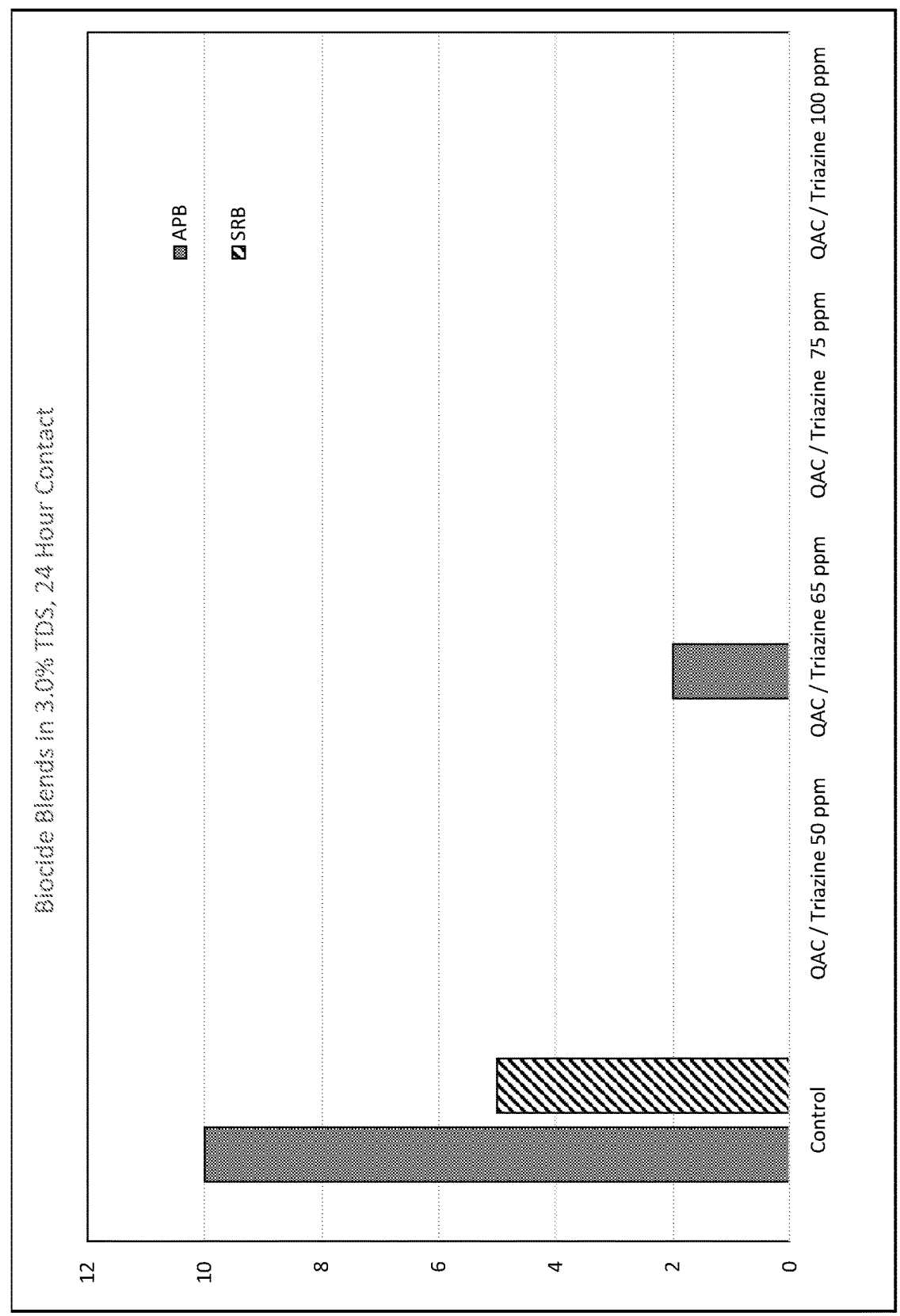
Figure 13:
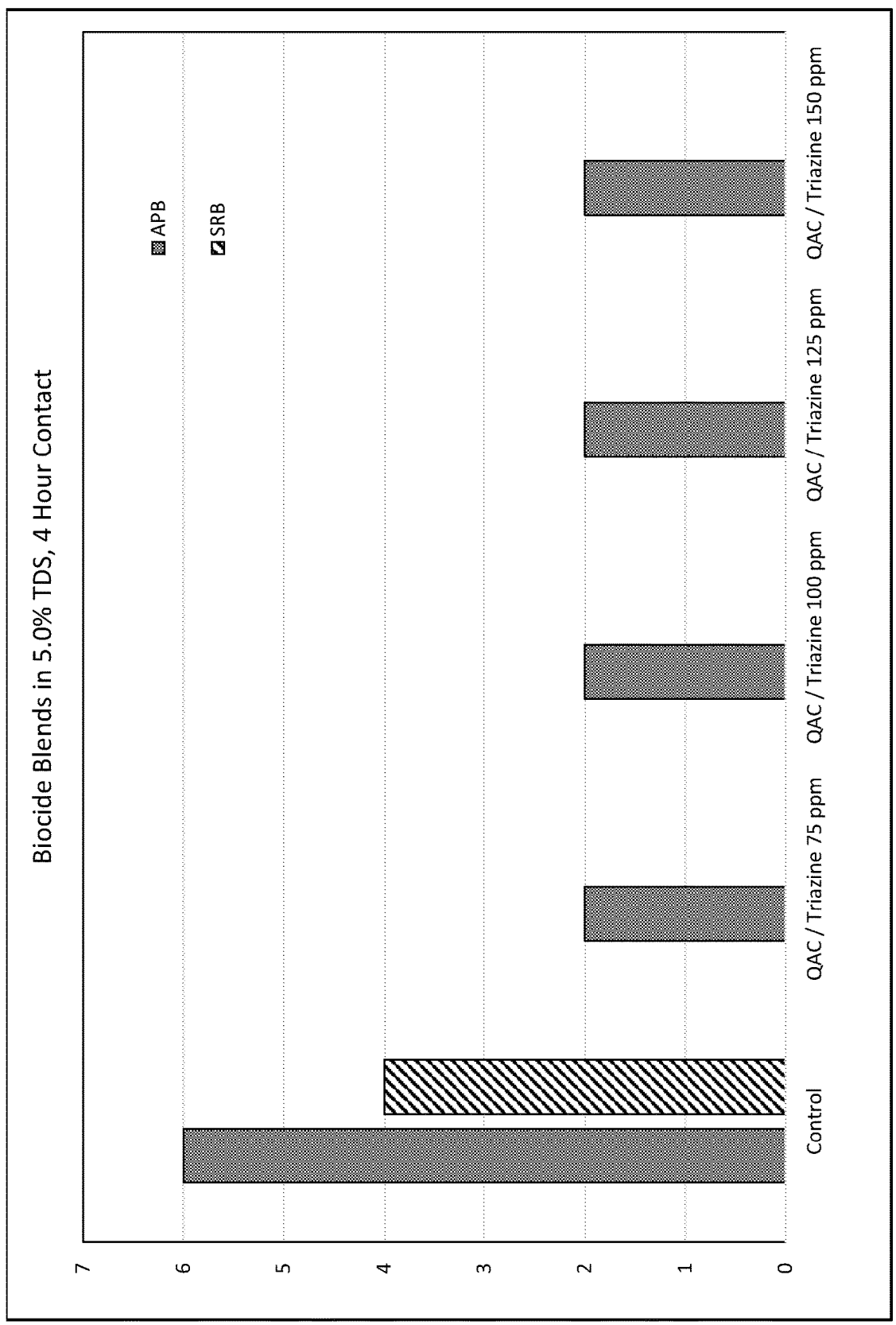
Figure 14:
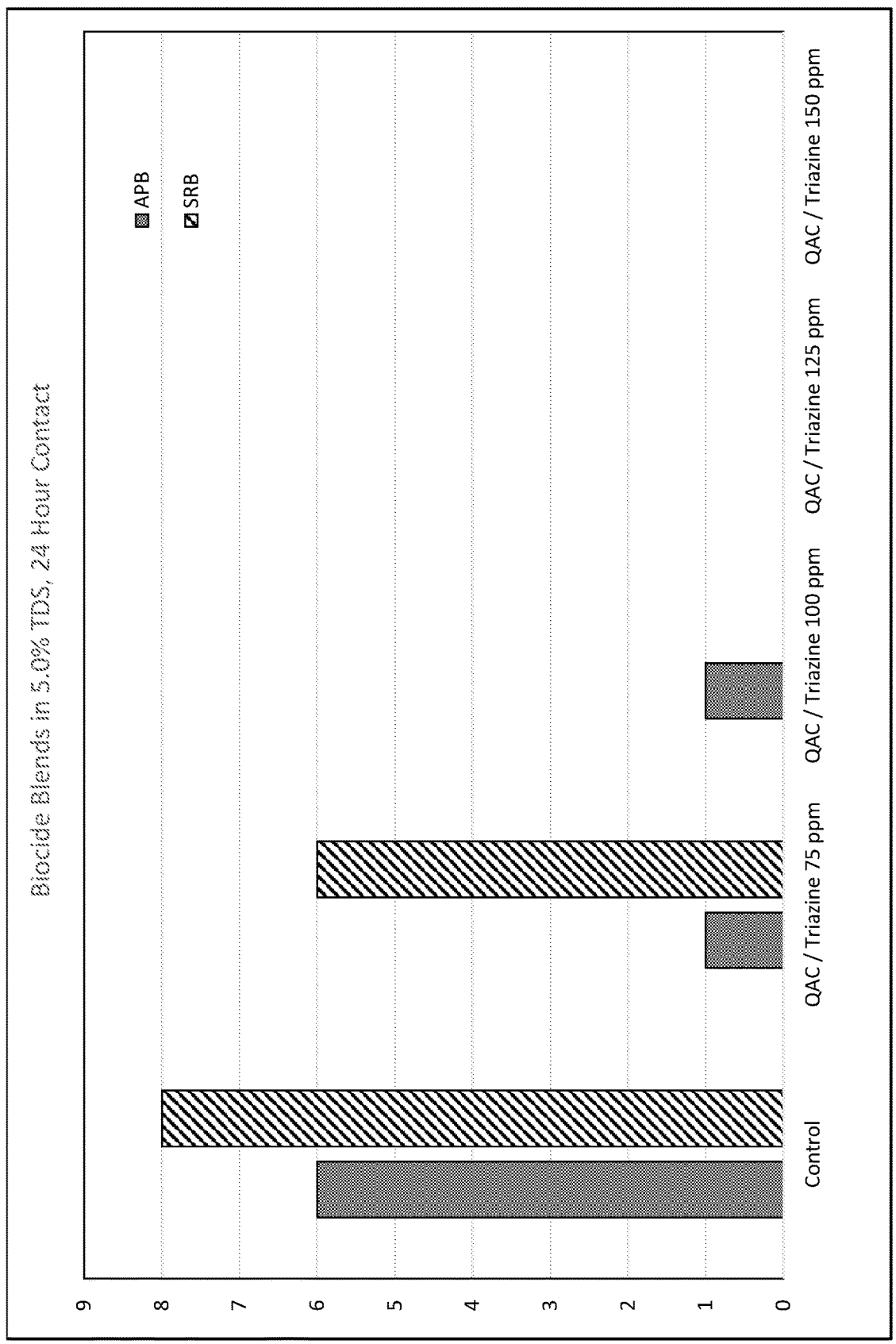

FIGS. 3 and 4 represent biocidal activity of different biocides and different biocide blends. Table 2 lists the specific biocides and biocide blends. The biocides were 2,2-dibromo-3-nitrilopropionamide ("DBNPA"), a quaternary ammonium compound of alkyldimethylbenzylammonium chloride ("ADBAC"), triazine, glutaraldehyde, or combinations thereof. The ADBAC/triazine blends had a 1:10 dilution.

TABLE 2

| Number | Type of Biocide or Blend (% by volume) | Concentration (ppm) |
| --- | --- | --- |
| 1 | DBNPA | 6 |
| 2 | DBNPA | 12 |
| 3 | DBNPA | 24 |
| 4 | DBNPA | 54 |
| 5 | 70% ADBAC + 30% triazine blend | 6 |
| 6 | 70% ADBAC + 30% triazine blend | 12 |

TABLE 2-continued

| Number | Type of Biocide or Blend (% by volume) | Concentration (ppm) |
|---|---|---|
| 7 | 70% ADBAC + 30% triazine blend | 24 |
| 8 | 70% ADBAC + 30% triazine blend | 54 |
| 9 | 60% ADBAC + 40% triazine blend | 6 |
| 10 | 60% ADBAC + 40% triazine blend | 12 |
| 11 | 60% ADBAC + 40% triazine blend | 24 |
| 12 | 60% ADBAC + 40% triazine blend | 54 |
| 13 | 50% ADBAC + 50% triazine blend | 6 |
| 14 | 50% ADBAC + 50% triazine blend | 12 |
| 15 | 50% ADBAC + 50% triazine blend | 24 |
| 16 | 50% ADBAC + 50% triazine blend | 54 |
| 17 | 40% ADBAC + 60% triazine blend | 6 |
| 18 | 40% ADBAC + 60% triazine blend | 12 |
| 19 | 40% ADBAC + 60% triazine blend | 24 |
| 20 | 40% ADBAC + 60% triazine blend | 54 |
| 21 | 30% ADBAC + 70% triazine blend | 6 |
| 22 | 30% ADBAC + 70% triazine blend | 12 |
| 23 | 30% ADBAC + 70% triazine blend | 24 |
| 24 | 30% ADBAC + 70% triazine blend | 54 |
| 25 | 50% glutaraldehyde + 50% ADBAC blend | 6 |
| 26 | 50% glutaraldehyde + 50% ADBAC blend | 12 |
| 27 | 50% glutaraldehyde + 50% ADBAC blend | 24 |
| 28 | 50% glutaraldehyde + 50% ADBAC blend | 54 |

As can be seen in FIGS. 3 and 4, the ADBAC quat/triazine blend exhibited superior biocidal activity to control APB and SRB bacteria compared to DBNPA and the glutaraldehyde/ADBAC quat blend. As can also be seen, at a concentration of 54 ppm, every one of the ADBAC quat/triazine blends exhibited complete control of microbial growth regardless of the ratio of the ADBAC quat and triazine. This demonstrates that the ratio of the quaternary ammonium compound and the formaldehyde-releasing biocide as well as the concentration of the biocide blend can be adjusted to provide the desired biocidal activity.

FIGS. 5-8 represent biocidal activity of an alkyldimethylbenzylammonium chloride ("ADBAC") quat/triazine biocide blend at a concentration of 54 ppm in fluids having 1% or 3% total dissolved solids ("TDS"). Table 3 lists the ratios of the ADBAC/triazine in the biocide blend.

TABLE 3

| Number | ADBAC | Triazine |
|---|---|---|
| 1 | 82.5 | 17.5 |
| 2 | 80 | 20 |
| 3 | 77.5 | 22.5 |
| 4 | 75 | 25 |
| 5 | 72.5 | 27.5 |
| 6 | 70 | 30 |
| 7 | 67.5 | 32.5 |
| 8 | 65 | 35 |
| 9 | 62.5 | 37.5 |
| 10 | 60 | 40 |
| 11 | 100 (40.5 ppm) | 0 |
| 12 | 0 | 100 (16.9 ppm) |

As can be seen in FIGS. 5-8, the addition of a quaternary ammonium compound (ADBAC) to triazine to form a biocide blend exhibited superior microbial control compared to triazine alone. The ADBAC/triazine blend performed very well in 1% and 3% TDS at both 4-hour and 24-hour contact times. This demonstrates that the biocide blend can maintain biocidal activity in a variety of wellbore treatment fluids.

FIGS. 9-14 represent biocidal activity for a quaternary ammonium compound "QAC" (ADBAC)/triazine blend at a variety of concentrations in fluids having total dissolved solids of 0.5%, 3%, or 5% at 4-hour or 24-hour contact times. As can be seen in FIGS. 9-14, as the concentration of the TDS increases, the concentration of the biocide blend can be increased in order to provide a desired microbial growth control. As can also be seen, the contact time of the biocide blend with the bacteria may also be increased as the concentration of the TDS increases. This demonstrates that the concentration of the biocide blend and the contact time can be selected to provide a desired microbial growth control depending on the specifics of the treatment fluid or a fluid to be encountered within a subterranean formation.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more biocides, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:
   introducing a treatment fluid into the portion of the subterranean formation, wherein the treatment fluid comprises:
   a base fluid; and
   a biocide blend comprising:
      a first biocide, wherein the first biocide is a formaldehyde-releasing biocide; and a second biocide, wherein the second biocide is a quaternary ammonium compound, wherein the ratio of the first biocide to the second biocide in the biocide blend ranges from 70:30 to 30:70, wherein each of the first biocide and the second biocide possess a first property, and wherein the first property is the same.

2. The method according to claim 1, wherein the first biocide is a triazine compound.

3. The method according to claim 2, wherein the triazine compound further comprises one or more substituents, wherein the one or more substituents are selected from the group consisting of a chloride ion, oxygen, sulfur, sodium, an amino group, an alcohol group, a thiol group, a carbonyl group, a methoxy group, a thioxo group, a methyl group, a carboxylate group, a trifluoromethyl group, a cyclic compound, and combinations thereof.

4. The method according to claim 1, wherein the quaternary ammonium compound has one nitrogen atom that is quaternized.

5. The method according to claim 1, wherein the quaternary ammonium compound comprises one or more alkyl chains, and wherein the alkyl chain length ranges from $C_{12}$ to $C_{22}$.

6. The method according to claim 1, wherein the quaternary ammonium compound is selected from alkyldimethylbenzylammonium chloride or didecyldimethylammonium chloride.

7. The method according to claim 1, wherein the first property is thermal stability.

8. The method according to claim 7, wherein at least 75% by weight of the first biocide and the second biocide are thermally stable at a temperature less than or equal to 135° C.

9. The method according to claim 1, wherein the first biocide, the second biocide, or both the first biocide and the second biocide maintain biocidal activity for at least 6 months.

10. The method according to claim 1, wherein the first biocide, the second biocide, or both the first biocide and the second biocide possess all of a set of desirable properties selected from maintaining biocidal activity in fluids having a total dissolved solids concentration in the range of 500 to 300,000 milligrams per liter, thermal stability, maintaining biocidal activity in the presence of ammonia or primary amines, quick kill, persistence, and no interaction with anionic additives.

11. The method according to claim 1, wherein the first biocide and the second biocide possess a second property, and wherein the second property is the same.

12. The method according to claim 1, wherein the base fluid comprises water, and wherein the water is selected from the group consisting of freshwater, brackish water, saltwater, and any combination thereof.

13. The method according to claim 1, further comprising adding the biocide blend to the base fluid prior to introduction into the portion of the subterranean formation.

14. The method according to claim 13, further comprising storing the biocide blend prior to adding the biocide blend to the base fluid, wherein the biocide blend is stored at a temperature less than or equal to the degradation temperature of the formaldehyde-releasing biocide.

15. The method according to claim 14, wherein the formaldehyde-releasing biocide releases less than 10% volume formaldehyde per volume of the formaldehyde-releasing biocide prior to introduction of the treatment fluid into the subterranean formation.

16. The method according to claim 1, wherein the treatment fluid further comprises a hydrogen sulfide scavenger.

17. The method according to claim 1, wherein the biocide blend is in a concentration in the range of 5 to 300 parts per million of the base fluid.

18. A biocide blend for treating a portion of a wellbore comprising:
a first biocide, wherein the first biocide is a formaldehyde-releasing biocide; and
a second biocide, wherein the second biocide is a quaternary ammonium compound, wherein the ratio of the first biocide to the second biocide in the biocide blend ranges from 70:30 to 30:70, wherein each of the first biocide and the second biocide possess a first property, and wherein the first property is the same.

19. The biocide blend according to claim 18, wherein the first biocide is a triazine compound.

20. The biocide blend according to claim 18, wherein the first biocide, the second biocide, or both the first biocide and the second biocide possess all of a set of desirable properties selected from maintaining biocidal activity in fluids having a total dissolved solids concentration in the range of 500 to 300,000 milligrams per liter, thermal stability, maintaining biocidal activity in the presence of ammonia or primary amines, quick kill, persistence, and no interaction with anionic additives.

* * * * *